United States Patent
Ackelid

(10) Patent No.: US 9,162,394 B2
(45) Date of Patent: Oct. 20, 2015

(54) METHOD AND DEVICE FOR PRODUCING THREE-DIMENSIONAL OBJECTS

(75) Inventor: Ulf Ackelid, Gothenburg (SE)

(73) Assignee: Arcam AB, Mölndal (SE)

(*) Notice: Subject to any disclaimer, the term of this patent is extended or adjusted under 35 U.S.C. 154(b) by 0 days.

(21) Appl. No.: 13/485,158

(22) Filed: May 31, 2012

(65) Prior Publication Data

US 2012/0234671 A1    Sep. 20, 2012

Related U.S. Application Data

(62) Division of application No. 12/599,954, filed as application No. PCT/SE2008/050562 on May 14, 2008.

(60) Provisional application No. 60/924,440, filed on May 15, 2007.

(51) Int. Cl.
*B29C 67/00* (2006.01)
*B22F 3/105* (2006.01)

(52) U.S. Cl.
CPC ........... *B29C 67/0077* (2013.01); *B22F 3/1055* (2013.01); *B22F 2998/00* (2013.01); *B22F 2999/00* (2013.01)

(58) Field of Classification Search
CPC .................................................. B29C 67/0077
USPC ........................................................ 264/497
See application file for complete search history.

(56) References Cited

U.S. PATENT DOCUMENTS

| | | |
|---|---|---|
| 4,818,562 A | 4/1989 | Arcella et al. |
| 4,844,775 A * | 7/1989 | Keeble ............................ 216/68 |
| 4,863,538 A | 9/1989 | Deckard |
| 5,647,931 A | 7/1997 | Retallick et al. |
| 6,136,257 A | 10/2000 | Graf et al. |
| 7,168,935 B1 | 1/2007 | Taminger et al. |
| 7,540,738 B2 | 6/2009 | Larsson et al. |
| 2002/0015654 A1* | 2/2002 | Das et al. ........................... 419/8 |
| 2005/0186538 A1 | 8/2005 | Uckelmann |
| 2008/0116370 A1* | 5/2008 | Splendore et al. ............ 250/288 |
| 2010/0163405 A1 | 7/2010 | Ackelid |

FOREIGN PATENT DOCUMENTS

SE    524467 C2    8/2004

OTHER PUBLICATIONS

U.S. Appl. No. 12/599,954 Response Filed Jan. 5, 2012 to Restriction Requirement mailed Dec. 5, 2011, 5 pgs.
U.S. Appl. No. 12/599,954, Non Final Office Action mailed May 23, 2012, 6 pgs.
U.S. Appl. No. 12/599,954, Restriction Requirement mailed Dec. 5, 2011, 6 pgs.
International Application Serial No. PCT/SE2008/050562, International Search Report mailed Sep. 10, 2008, 3 pgs.

* cited by examiner

*Primary Examiner* — Larry Thrower
(74) *Attorney, Agent, or Firm* — Stroock & Stroock & Lavan LLP

(57) ABSTRACT

The invention concerns a method for producing three-dimensional objects (3) layer by layer using a powdery material (5) which can be solidified by irradiating it with a high-energy beam.

13 Claims, 4 Drawing Sheets

METHOD AND DEVICE FOR PRODUCING THREE-DIMENSIONAL OBJECTS

CLAIM OF PRIORITY

This application is a divisional of U.S. Application Ser. No. 12/599,954 filed Nov. 12, 2009, entitled "METHOD AND DEVICE FOR PRODUCING THREE-DIMENSIONAL OBJECTS" which is a nationalization under 35 U.S.C. 371 of PCT/SE2008/050562, filed May 14, 2008 and published as WO 2008/147306 A1 on Dec. 4, 2008, which claimed priority under 35 U.S.C. 119(e) to U.S. Provisional Patent Application Ser. No. 60/924,440, filed May 15, 2007; which applications and publication are incorporated herein by reference and made a part hereof in its entirety.

TECHNICAL FIELD

This invention relates to a method and device for producing three-dimensional objects layer by layer using a powdery material which can be solidified by irradiating it with a high-energy beam.

BACKGROUND ART

Equipment for producing a three-dimensional object layer by layer using a powdery material which can be solidified, or fused together, by irradiating it with a high-energy beam of electromagnetic radiation or electrons are known from e.g. U.S. Pat. No. 4,863,538, U.S. Pat. No. 5,647,931 and SE524467. Such equipment include for instance a supply of powder, means for applying a layer of powder on a vertically adjustable platform or working area, and means for directing the beam over the working area. The powder sinters or melts and solidifies as the beam moves over the working area.

When melting or sintering a powder using a high-energy beam, it is important to avoid exceeding the vaporization temperature of the powder, since otherwise the powder will merely vaporise instead of forming the intended product. US2005/0186538 discloses a method focusing on this problem. In this method a laser beam repeatedly is directed to the same powder target area during the melting/sintering phase as to stepwise raise the powder temperature. This way, a too high powder temperature is avoided.

When using an electron beam instead of a laser beam, the situation is in some ways different. As the electron beam hits the powder, a charge distribution develops around the electron target area. Desirably, this charge will be led through a produced part of the article to be made and/or the powder bed towards ground. If the charge distribution density exceeds a critical limit, an electrical field having a field strength above a predetermined level will develop around the position where the beam is radiating. The electrical field having an electrical field strength above the predetermined level will be referred to as $E_{max}$. An electrical field will cause the powder particles to repel each other such that particles leave the uppermost surface layer of the particle and create a distribution of particles floating above the surface. The floating particles resemble a cloud positioned above the surface. When the electrical field has a field strength above $E_{max}$, the electrical field, i.e. the particle cloud, will influence the resolution of the device in a negative way. This is partly due to the fact that the particles in the particle cloud will diverge the electron beam. When the electrical field has a field strength below $E_{max}$, the electrical field, i.e. the particle cloud, will not influence the resolution of the device in a significant way. A field strength below $E_{max}$, is thus desirable.

Since the particles are charged they will seek a ground contact and thereby some may leave the cloud and will then contaminate different parts of the device being positioned inside the vacuum chamber. A result of such a critical electrical field is that the structure of the powder surface will be destroyed. Applying the method according to US2005/0186538 to a powder melting/sintering device equipped with an electron beam is likely to give a poor result since no measures are taken in that method to avoid a critical electrical having a field strength above said predetermined level to develop.

One solution to the problem of avoiding discharges is to add conductive material, such as carbon, to the powder as to increase the electrical conductivity of the powder. Disadvantages of this solution are, however, that the solidifying process of such a powder mixture may be difficult to control and that the properties of the formed product may be affected in a negative way. For instance, the mechanical strength may be decreased.

DISCLOSURE OF INVENTION

The object of this invention is to provide a method and device for layer-wise production of three-dimensional objects from a powdery material, which method and device allow for a controlled and proper fusing together of the powdery material, and which are well suited for both an electron beam. This object is achieved by the method and device defined in the independent claims. The dependent claims contain advantageous embodiments, further developments and variants of the invention.

The invention concerns a method for producing three-dimensional objects layer by layer using a powdery material, which can be solidified by irradiating it with a high-energy beam. The invention is characterized in that the method comprises the step of controlling the amount of ions present in the close vicinity in the position where the high-energy beam radiates the powdery material. By controlling an amount of ions present in the close vicinity of the high energy beam it has shown that the tendency to build up a cloud is reduced. Hence the high energy beam, i.e. the electron gun, can operate with a higher output power without creating an electrical field above said predetermined level. This effect is achieved by that the ions in the vicinity of the radiating point of the high energy beam reduces the charge density in said vicinity. Naturally, when the high energy beam is an electron gun the ions should be positive. It is advantageous that the number of ions is above a level required to keep the electrical field strength below $E_{max}$. In doing so, enough of the powdery material is neutralised.

In a first embodiment of the invention, the amount of ions present in the close vicinity in the position where the high-energy beam radiates is controlled by using the method steps of:
  introducing a supplementary gas into the vacuum chamber of the equipment, and
  controlling the pressure of the gas to a predefined pressure level, where said supplementary gas is capable of producing ions when irradiated by the high-energy beam.

It is advantageous that the produced number of ions is above a level required to keep the electrical field strength below $E_{max}$. In doing so, enough of the powdery material is neutralised.

Suitable the vacuum chamber displays a pressure of less than $1*10^{-4}$ mbar before the supplementary gas is introduced. The supplementary gas will raise the pressure in the vacuum chamber to be in the interval between $1*10^{-1}$ mbar and $10^{-4}$ mbar. Preferably the pressure after introduction of the supplementary gas is between $10^{-2}$ mbar and $10^{-3}$ mbar. A higher pressure will lead to more ions being available at the surface of the powder layer, hence greater power of the electron gun can be accepted without creation of a cloud. On the other hand a high pressure will lead to that the ray from the electron gun will be dispersed to a greater extent, thereby leading to reduced resolution of the part to be produced. It has shown that introduction of the supplementary gas between $10^{-2}$ mbar and $10^{-3}$ mbar lead to a good balance between these two effects.

In an embodiment of the invention an inert gas is used. Argon is particularly suitable for use together with production of Titanium alloys. Helium can also be contemplated. Nitrogen can suitably be used together with Cobalt-Chrome alloys.

In a second embodiment of the invention, the amount of ions present in the close vicinity in the position where the high-energy beam radiates is controlled by using the method step of:

introducing ions into the vacuum chamber of the equipment.

By introducing ions into the vacuum chamber, using an ion source such as a sputter device or a plasma device, the number of charged ions in the vacuum chamber can be controlled. Hence, the effect of electron gun dispersion can thus be reduced due to the possibility to operate at a low pressure while still having access to a sufficient amount of charged ions. The on concentration can be obtained by controlling the amount of ions introduced into the vacuum chamber. The ions are preferably directed in the direction to the powdery material. Depending on the charge of the particles in the powdery bed, the ions introduced are either negatively charged or positively charged. The most common case is when the powdery bed is negatively charged, thus in this case positively charged ions will be used.

Suitably the number of ions introduced into the vacuum chamber is controlled in dependence of the output power of the high-energy beam. Since a large portion of the electrons provided from the electron gun will be discharged via the part of the object made and/or the powder bed to ground, only a small portion of the electrons provided by the electron gun needs to be compensated for. It is thus preferred to keep the rate of ions introduced into the vacuum chamber above a level required to keep the electrical field strength below $E_{max}$.

The invention also relates to a device for producing three-dimensional objects layer by layer using a powdery material which can be solidified by irradiating it with a high-energy beam, which device is adapted to be operated by at least one of the method steps described above.

BRIEF DESCRIPTION OF DRAWINGS

In the description of the invention given below reference is made to the following figure, in which.

EMBODIMENT(S) OF THE INVENTION

Figure 1:
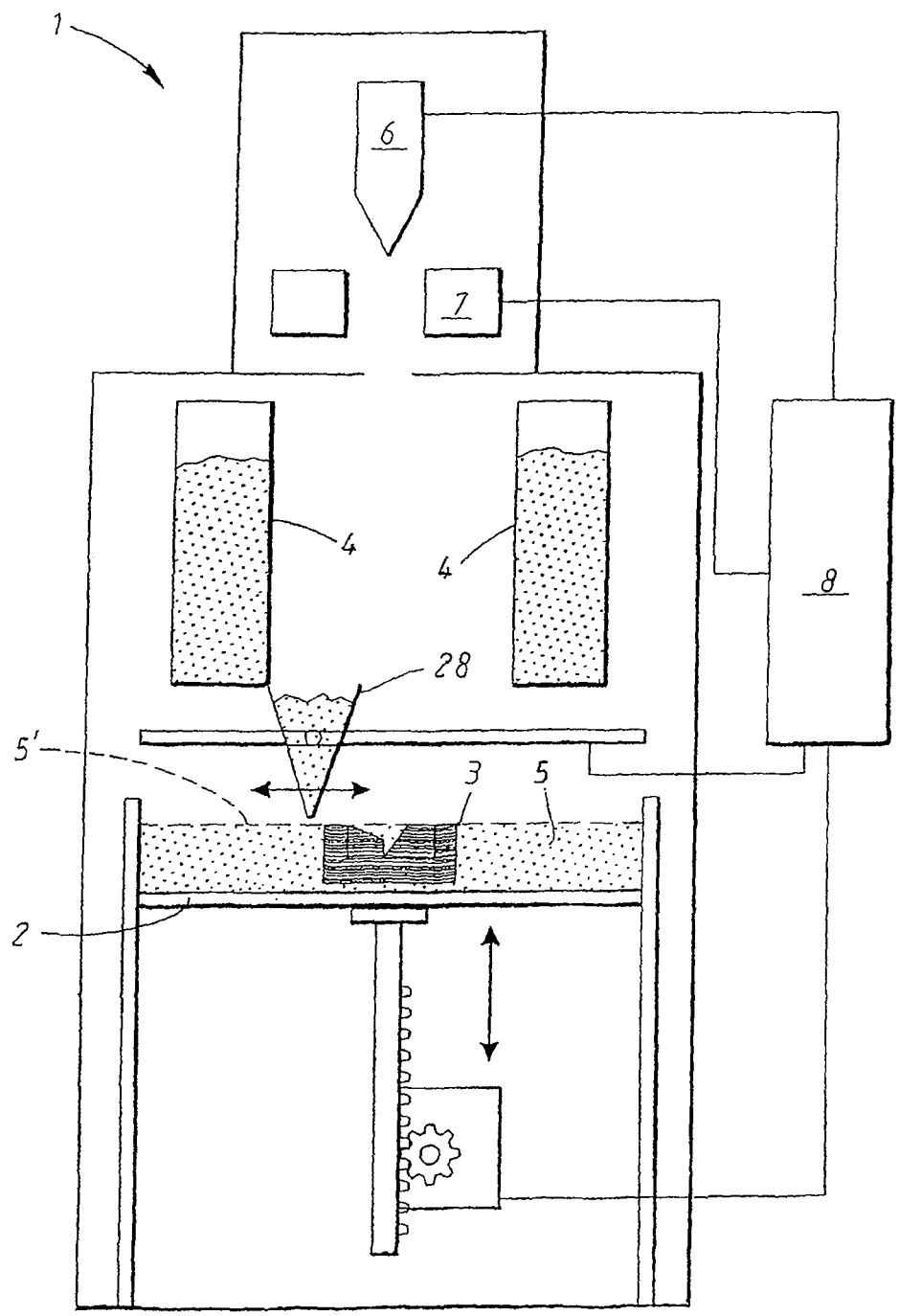
FIG. 1 shows, in a schematic view, an example of a known device for producing a three-dimensional product.

FIG. 1 shows an example of a known device 1 for producing a three-dimensional product. The device 1 comprises a vertically adjustable work table 2 on which a three-dimensional product 3 is to be built up, one or more powder dispensers 4, means 28 arranged to distribute a thin layer of powder on the work table 2 for forming a powder bed 5, a radiation gun 6 in the form of an electron gun for delivering energy to the powder bed 5 as to fuse together parts of the powder bed 5, deflection coils 7 for guiding the electron beam emitted by the radiation gun 6 over said work table 2, and a control unit 8 arranged to control the various parts of the device 1. In a typical work cycle, the work table 2 is lowered, a new layer of powder is applied onto the powder bed 5, and the electron beam is scanned over selected parts of the upper layer 5' of the powder bed 5. In principal, this cycle is repeated until the product is finished. An expert in the field is familiar with the general function and composition of devices for producing a three-dimensional product, both with regard to the type outlined in FIG. 1. The complete device 1 will constitute a vacuum chamber in which a low pressure is achieved by a vacuum pump (not shown). The pressure in the vacuum chamber is preferably held at a pressure level below $10^{-4}$ mbar.

In the case where an electron beam is used, it is necessary to consider the charge distribution that is created in the powder as the electrons hit the powder bed 5. The invention is, at least partly, based on the realization that the charge distribution density depends on the following parameters: beam current, electron velocity (which is given by the accelerating voltage), beam scanning velocity, powder material and electrical conductivity of the powder, i.e. mainly the electrical conductivity between the powder grains. The latter is in turn a function of several parameters, such as temperature, degree of sintering and powder grain size/size distribution.

Thus, for a given powder, i.e. a powder of a certain material with a certain grain size distribution, and a given accelerating voltage, it is possible, by varying the beam current (and thus the beam power) and the beam scanning velocity, to affect the charge distribution.

By varying these parameters in a controlled way, the electrical conductivity of the powder can gradually be increased by increasing the temperature of the powder. A powder that has a high temperature obtains a considerably higher conductivity which results in a lower density of the charge distribution since the charges quickly can diffuse over a large region. This effect is enhanced if the powder is allowed to be slightly sintered during the pre-heating process. When the conductivity has become sufficiently high, the powder can be fused together, i.e. melted or fully sintered, with arbitrary values of the beam current and beam scanning velocity.

A general function for describing the charge density that develops in the powder in an arbitrary scanning procedure will be a rather complex function of time and beam position since the charge density generated along one scanned path will be affected by the charge density generated along another scanned path if these paths are not very well separated in space and time. Thus, summation effects between different paths must be taken into account.

Figure 2:
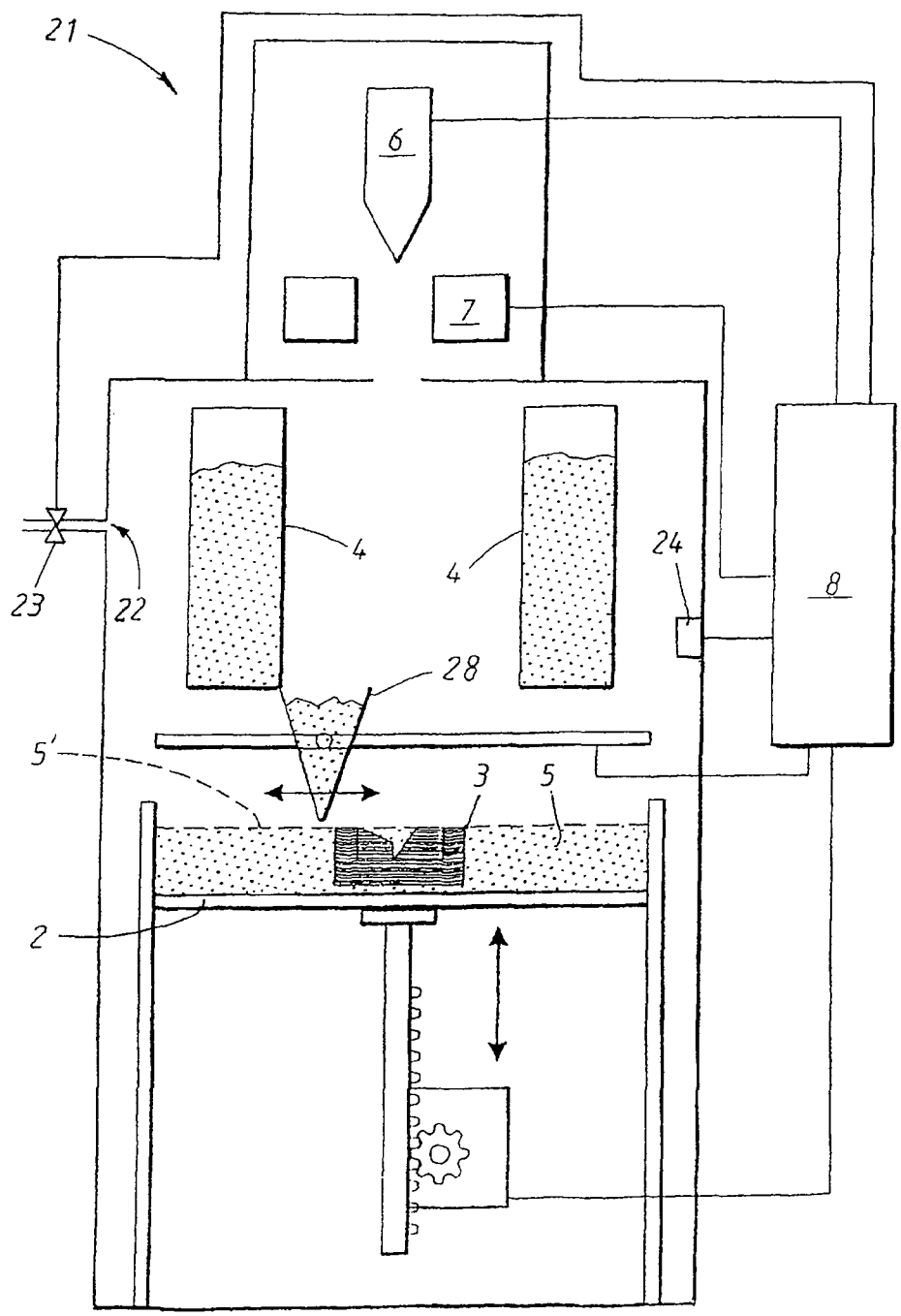
FIG. 2 shows, in a schematic view, an example of a device for producing a three-dimensional product in which device a first embodiment of the inventive method can be applied.

FIG. 2 shows an example of a device 21 for producing a three-dimensional product in which a first embodiment of the inventive method can be used.

The device 21 comprises, apart from the parts described in FIG. 1, also a gas inlet 22 in to which a supplementary gas can be introduced into the vacuum chamber of the device. The gas inlet is regulated by a controllable valve 23 that can be controlled by the control unit 8. The controllable valve 23, and thus the gas pressure in the vacuum chamber, may be controlled with respect to the pressure in the vacuum chamber.

This pressure can be measured with a pressure sensor 24 connected to the control unit 8.

Figure 3:
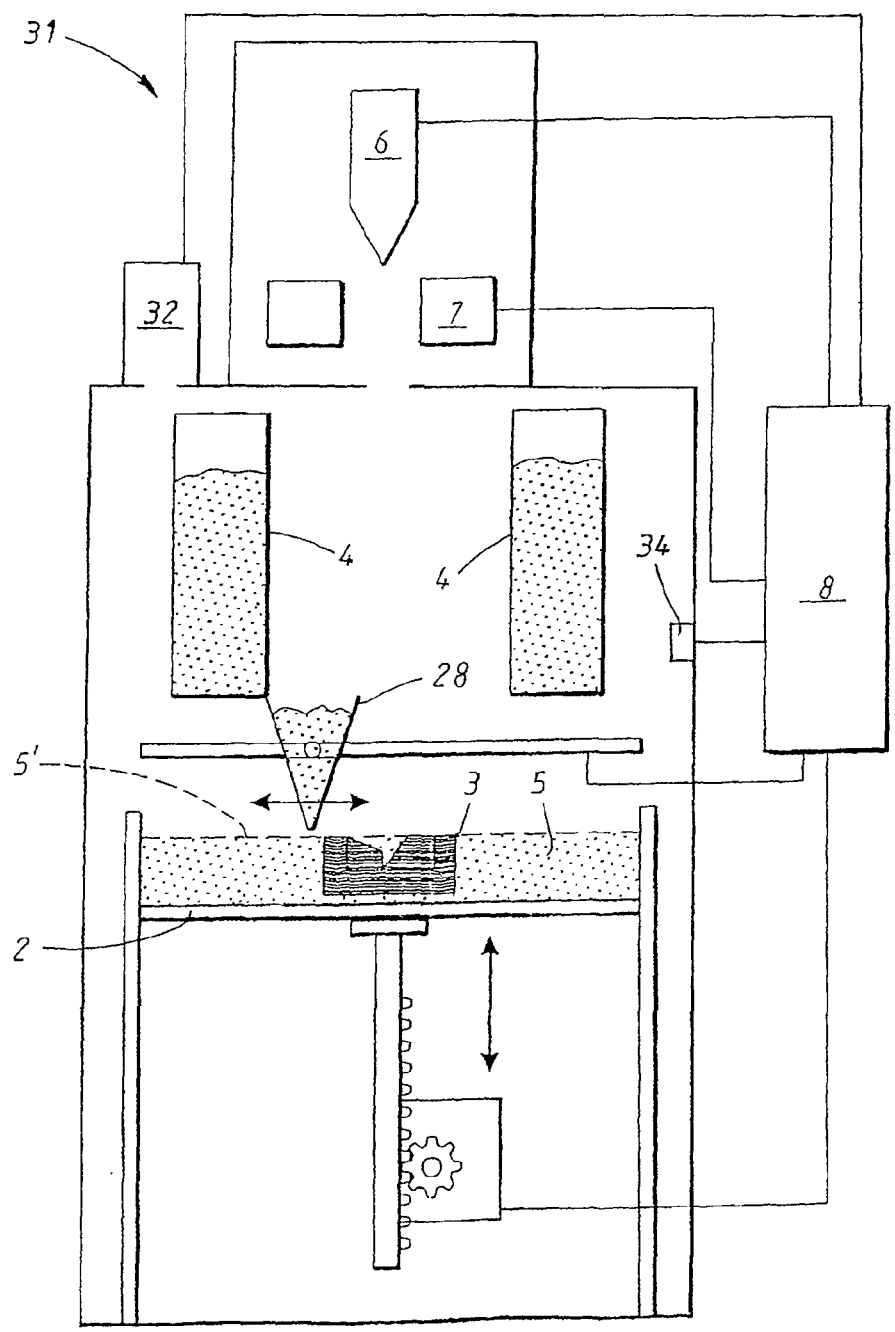
FIG. 3 shows, in a schematic view, an example of a device for producing a three-dimensional product in which device a second embodiment of the inventive method can be applied.

FIG. 3 shows an example of a device 31 for producing a three-dimensional product in which a second embodiment of the inventive method can be used. The device 31 comprises, apart from the parts described in FIG. 1, also a sputter device 32 by which ions can be introduced into the vacuum chamber of the device. The sputter device 32 may be controlled by the control unit 8. The gas used in the sputter device 32 to create the ions is preferably an inert gas such as Argon. The pressure in the vacuum chamber is kept at a predefined level, preferably below $10^{-4}$ mbar. The pressure in the vacuum chamber can be measured with a pressure sensor 34 connected to the control unit 8.

Figure 4:
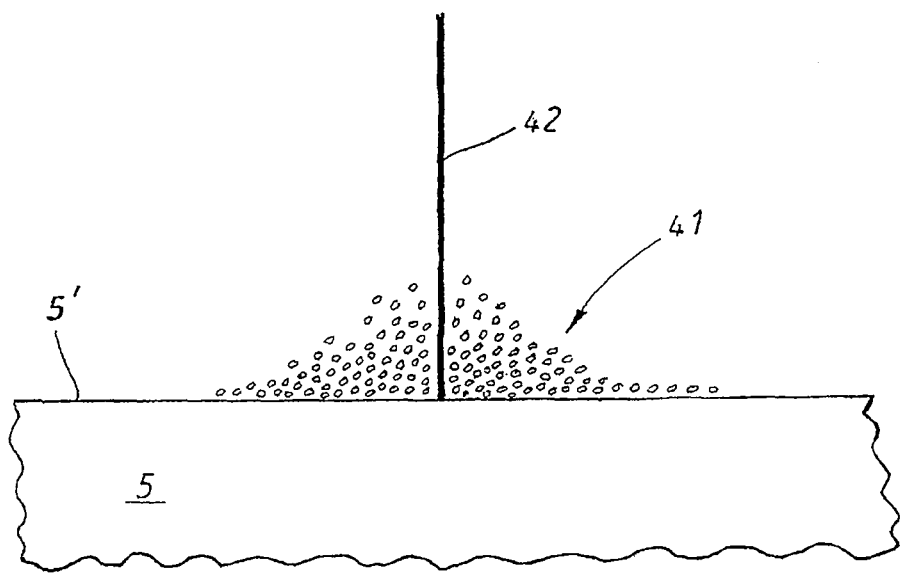
FIG. 4 shows, in a schematic view, an example of the surface of the powdery material with a charged particle cloud.

FIG. 4 shows the upper layer 5 of the powder bed 5 of the powdery material with a charged particle cloud 41. The cloud is concentrated around the position where the electron beam 42 radiates the powdery material. With a higher electrical field, a larger cloud will occur around the radiating point. It is therefore an object of the invention to limit the size, i.e. height, of the cloud. The number of ions introduced into the vacuum chamber or created in the vacuum chamber should thus be above a predefined level in order to neutralise enough charges in the cloud. The predefined level should be selected such that it keeps the electrical field strength below $E_{max}$. In doing so, enough of the powdery material is neutralised.

The invention is not to be regarded as being limited to the embodiments described above, a number of additional variants and modifications being possible within the scope of the subsequent patent claims.

What is claimed is:

1. A method for producing three-dimensional objects, layer by layer, using a powder material, the method comprising the steps of:
    directing a high-energy beam at a bed of powder material in a vacuum chamber of a device configured to produce a three-dimensional object and generating charged powder where the beam irradiates the powder;
    solidifying a powder material by irradiating the powder material with the high-energy beam; and
    introducing ions from an ion source into the vacuum chamber of the device configured to produce a three-dimensional object and reducing the amount of charged powder by neutralizing charged powder with the ions.

2. The method according to claim 1, wherein the ions are directed in the direction of the powder material.

3. The method according to claim 2, wherein the ion source is a sputter ion source.

4. The method according to claim 2, wherein the ion source is a plasma ion source.

5. The method according to claim 1, wherein the ions are positively charged.

6. The method according to claim 1, wherein the ions are negatively charged.

7. The method according to claim 1, wherein the vacuum chamber has a pressure of less than $1*10^{-4}$ mbar before the ions are introduced.

8. The method according to claim 1, wherein the ions are introduced into the vacuum chamber at a rate above a level required to keep an electrical field strength below a predetermined level, $E_{max}$.

9. The method according to claim 1, wherein the number of ions introduced into the vacuum chamber is controlled as a function of the outpour power of the high-energy beam.

10. The method according to claim 1, wherein the ions are directed to the powder material.

11. The method according to claim 1, wherein the high-energy beam is an electron beam from an electron gun.

12. The method according to claim 5, wherein the high-energy beam is an electron beam from an electron gun.

13. The method according to claim 8, wherein the high-energy beam is an electron beam from an electron gun.

* * * * *